(12) United States Patent
Chang

(10) Patent No.: US 6,330,898 B1
(45) Date of Patent: Dec. 18, 2001

(54) RAIN CANOPY APPARATUS FOR A STROLLER

(76) Inventor: Tony Chang, 16th Floor, No. 302, Jung He Road, Jung He City, Taipei Hsien (TW)

( * ) Notice: Subject to any disclaimer, the term of this patent is extended or adjusted under 35 U.S.C. 154(b) by 0 days.

(21) Appl. No.: 09/450,990

(22) Filed: Nov. 29, 1999

(51) Int. Cl.[7] .................................................. A47H 1/00
(52) U.S. Cl. .................. 160/24; 160/290.1; 160/351; 160/DIG. 15; 297/184
(58) Field of Search ................ 160/24, 26, 258, 160/264, 269, 270, 272, 290.1, 351, 368.1, 370.22, 398, DIG. 10, DIG. 11, DIG. 15; 297/184

(56) References Cited

U.S. PATENT DOCUMENTS

| | | | |
|---|---|---|---|
| 781,946 | * | 2/1905 | Harmany ............................ 160/398 |
| 2,204,739 | * | 6/1940 | Wells ........................ 160/370.22 X |
| 3,364,973 | * | 1/1968 | Railson ................................ 160/26 |
| 3,910,339 | * | 10/1975 | Kramer .................... 160/DIG. 15 X |
| 4,077,419 | * | 3/1978 | Lux .................................. 160/68 X |
| 4,858,990 | * | 8/1989 | Combs-Rose et al. .............. 297/184 |
| 4,872,724 | * | 10/1989 | Deley et al. ............. 160/DIG. 15 X |
| 5,013,085 | * | 5/1991 | Craig ................................. 297/184 |
| 5,096,257 | * | 3/1992 | Clark ................................. 297/184 |
| 5,121,782 | * | 6/1992 | Renkhoff et al. ................ 160/26 X |
| 5,615,725 | * | 4/1997 | Ming-Shun ..................... 160/370.22 |

* cited by examiner

Primary Examiner—Bruce A. Lev
(74) Attorney, Agent, or Firm—Birch, Stewart, Kolasch & Birch, LLP

(57) ABSTRACT

A rain canopy apparatus for a stroller provides a canopy for shielding the stroller from storms and snows. The canopy utilizes an edge spool to roll itself up and to be stored inside an accommodation pipe formed by pivotally connecting upper and lower half pipes. The accommodation pipe has slidable end caps at both ends. Each end cap provides a protruding threaded bar to engage with a clamp for being fixed to a respective side bar of the stroller. When the accommodation pipe is opened with the upper half pipe pivoted away from the lower half pipe, the canopy has one edge hung at the interior hooks of the accommodation pipe and another edge pulled to cover the whole stroller. The canopy apparatus for a stroller can have advantages in storability, portability and operation.

6 Claims, 7 Drawing Sheets

RAIN CANOPY APPARATUS FOR A STROLLER

BACKGROUND OF THE INVENTION (1) Field of the Invention

The invention relates to a rain canopy apparatus for a stroller, and more particularly to which its canopy can be scrolled and stored into an accommodation pipe clamping by both ends at both side bars of the stroller, for easy carrying and convenient operation.

(2) Description of the Prior Art

In a family with infant or kids, it is quite common to see people using a foldable stroller to carry his/her infant and kids while walking or shopping.

As the usage of the stroller increases, the reachable region of the stroller becomes wider in both indoors and outdoors. While moving the stroller outdoors, the weather condition is one of the problems needing delicate considerations. In a previous design, a movable head cover is used to shield from sunshine, and a transparent waterproof full cover upon the whole stroller is used to protect from the rain and wind. Though the full cover can prevent the kid in the stroller from the rain and the wind, yet the controllability of the stroller is substantially degraded for the controlling top horizontal bar of the stroller is almost blocked by the full cover. Even the top horizontal bar is still accessible by holding both the bar and the flexible cover simultaneously, slipping might happen to the holding due to the rain fallen on the smooth surface of the full cover. Such a design greatly jeopardizes the controllability and the usage of the stroller. In addition, the cover in the art is usually not integrated onto the stroller frames, which makes the additional carrying of the cover necessary. Particularly, the cover is usually stored in the stroller. However, such an job can be too tedious for some people to remember doing so. Even some people get used to put a folded cover inside a package of the stroller so that the carrying problem of the cover can be resolved, yet the folded cover as like a rain suit is hard to be folded well so that the folded profile and the respective volume might be far from an optimal profile and a minimum volume. As a result, saving space becomes a target unachievable regarding carrying a stroller cover. Further more, in case of a wet cover, it is obvious that storing the folded wet cover in the stroller is not good to the infant or kids in the stroller. In addition, if a stroller does not have a package, to carry a wet cover indoors all the time is not only a burden to people himself/herself, but also introduce unhappiness to other people.

SUMMARY OF THE INVENTION

Accordingly, it is an object of the present invention to provide a rain canopy apparatus for a stroller, by which aforesaid disadvantages of a convention stroller cover can be improved. In accordance with the present invention, a plurality of hole in a line for hooking a flexible canopy to a hook inside an accommodation pipe is located at a thicker end of the stroller canopy. The accommodation pipe is a hollow openable shell having an upper half pipe and a lower half pipe pivotal connected with the upper half pipe. Two end caps are provided to seal respective ends of the accommodation pipe. An outer end of the end cap extends to form a clamp. The end cap can move restrictively along an axial/longitudinal direction at the respective end of the accommodation pipe, so that the length of the rain canopy apparatus can be adjusted to meet various strollers. The rain canopy apparatus of the present invention is mounted between two sidebars of the stroller via two clamps formed at ends of the end caps. The sidebar is located right beneath a top horizontal bar of the stroller. By providing such an arrangement, the canopy can be rolled and stored inside the accommodation pipe fixed at the stroller. Thereby, the carrying and storing problem of a conventional stroller cover is thus resolved.

According to the present invention, the canopy is permanently stored at the stroller, so that the usage of the canopy is convenient. In addition, a spool is located at one end of the canopy for rolling the canopy compactly to be stored inside the accommodation pipe. Thus, the folding problem of a conventional stroller cover is then resolved. Further, residue rain on the canopy can be also stored temporarily in the sealed accommodation pipe for avoiding the possibility of moistening the stroller and/or the storage packet of the stroller. Thereby, all disadvantages of using a conventional stroller cover are improved by the present invention.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will now be specified with reference to its preferred embodiments illustrated in the drawings which are given by way of illustration only, and thus are not limitative of the present invention, and in which.

DESCRIPTION OF THE PREFERRED EMBODIMENT

The invention disclosed herein is directed to a rain canopy apparatus for a stroller. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Figure 1:
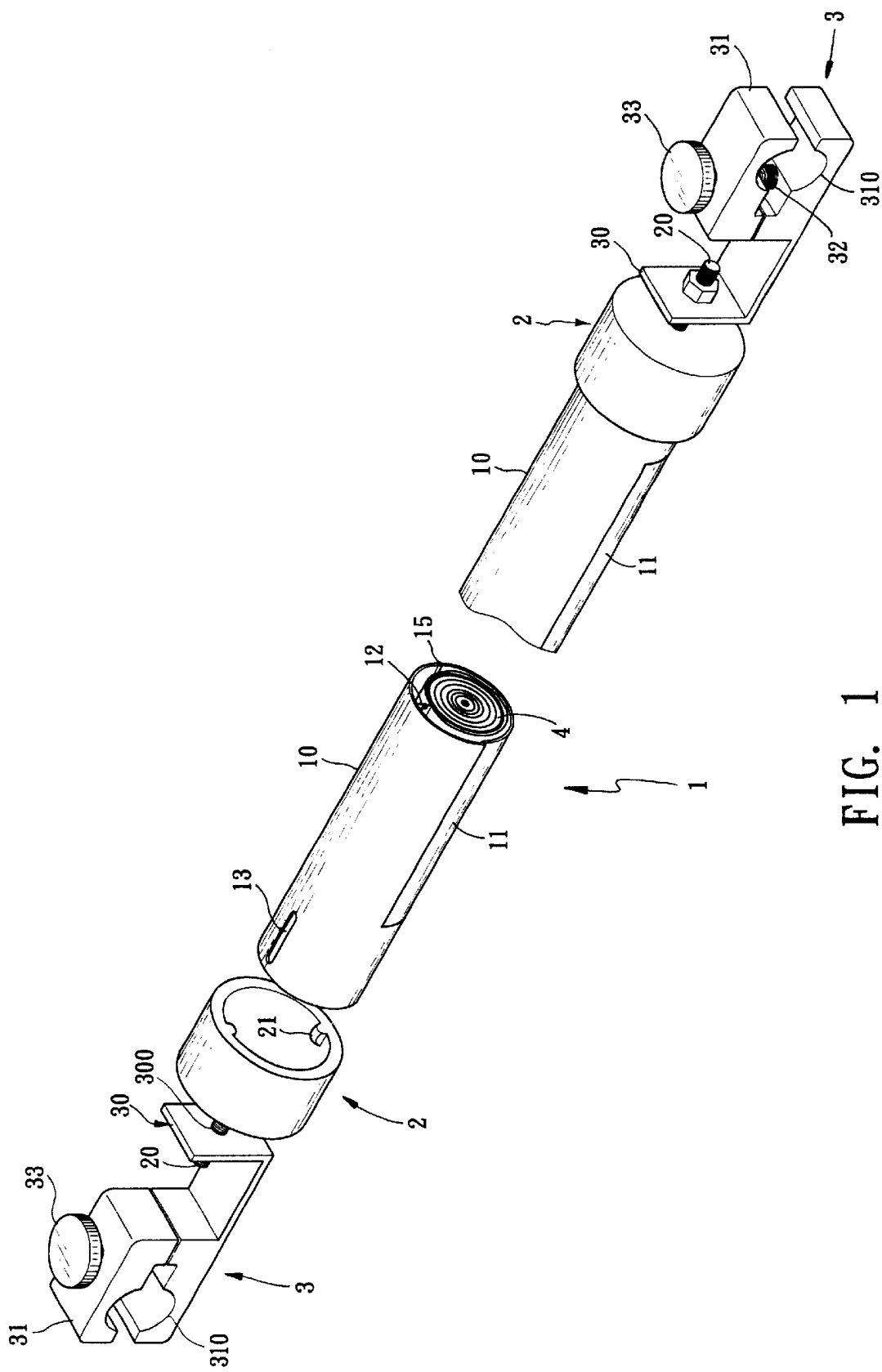
FIG. 1 is an partial exploded perspective view of an accommodation pipe and its accessories at both ends in accordance with the present invention.

Referring now to FIG. 1, the present invention mainly includes an accommodation pipe 1 formed by pivotally engaging two half pipes 10 and 11. The upper half pipe 10 includes a plurality of hooks 12 lining at a top interior thereof for hanging a roll-up canopy 4. The upper half pipe 10 is longer than the lower half pipe 11, and the upper half pipe 10 further includes a plurality of slippery grooves 13 at both protrusion ends. Preferably, the slippery grooves 13 are arranged up-and-down symmetrically. In addition, two end caps 2 are used to seal both ends of the accommodation pipe 1. The end cap 2 has an open end and an opposing close end. The open end for engaging with the respective end of the accommodation pipe 1 further includes a pair of inward flanges 21 at the edge rim thereof. The close end protrude a threaded bar 20 along the centerline of the end cap 2. By providing the slippery grooves 13 on the accommodation pipe 1 and the inward flanges 21 of the end caps 2, the accommodation pipe 1 and the end caps 2 can be mated tightly. Further, two clamps 3 are provided to have their tail L-shaped brackets 30 engage with respective end caps 2, by meshing the threaded bars 20 of the caps 2 with and through the respective threaded holes 300 on the L-shaped brackets 30. At a free end of each L-shaped bracket 30, a two-piece symmetric C-shaped vise 31 is formed. An adjusting bolt 33 is used to connect threadedly the two pieces of the vise 31, and a spring 32 is penetrated by the adjusting bolt 33 and is located between the two pieces of the vise 31. By providing the adjusting bolt 33 and the spring 32, the two-piece vise 31 located at the external end of the L-shaped bracket 30 can be effectively adjusted.

Figure 2:
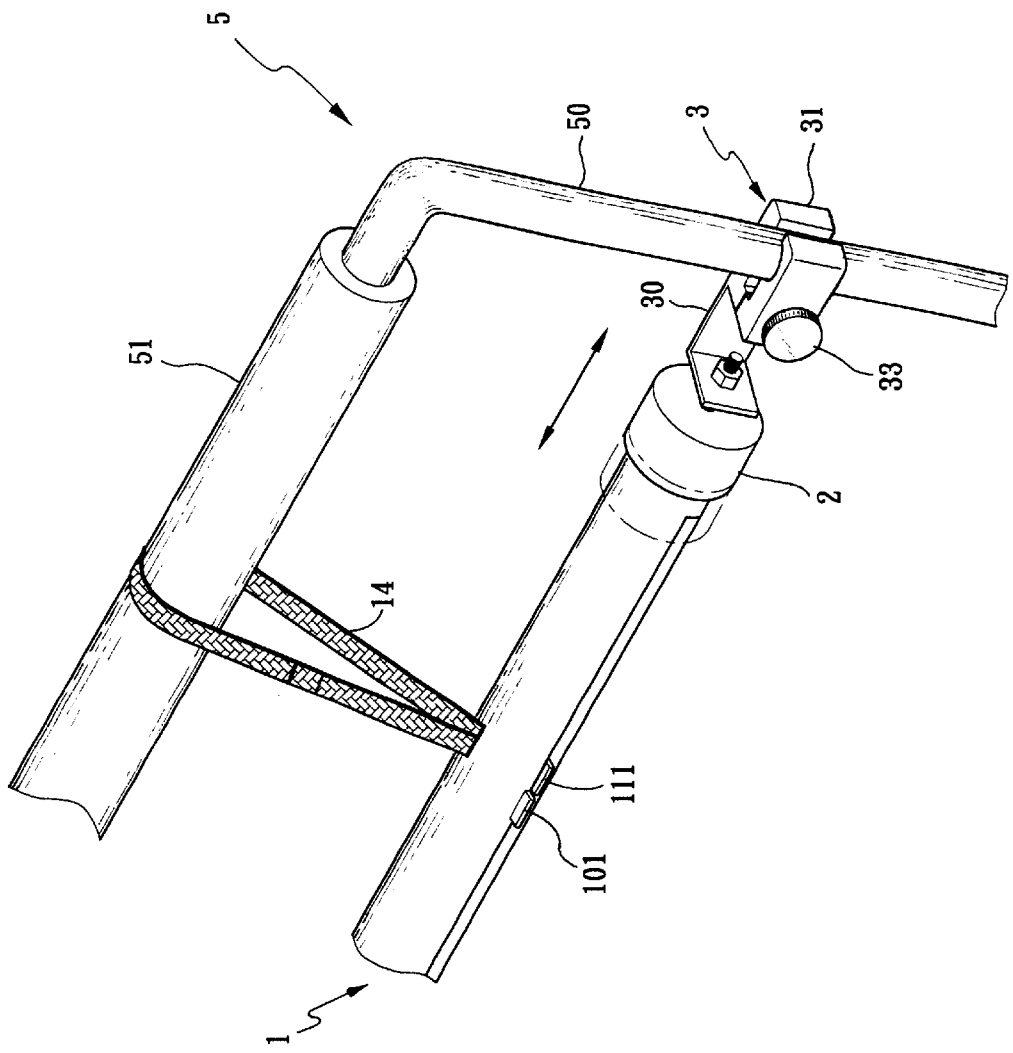
FIG. 2 shows partly the mounting of a rain canopy apparatus of the present invention onto a stroller.
Figure 3:
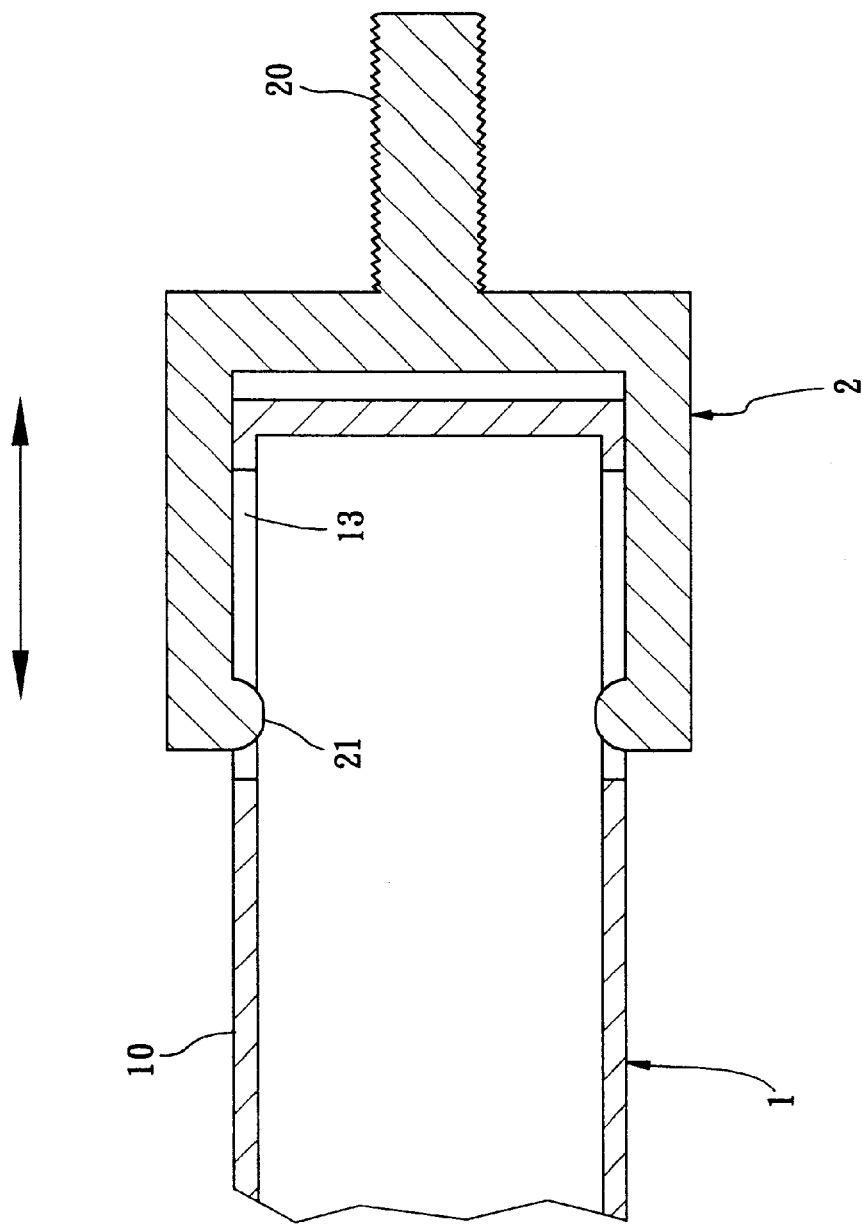
FIG. 3 is a cross section view of part of an end cap and the engaged accommodation pipe in accordance with the present invention.

Referring now to FIG. 1 to FIG. 3, the rain canopy apparatus in accordance with the present invention is mounted to a stroller 5 by applying each vise end 310 of each C-shaped vise 31 of the clamp 3 to clamping the respective side bar 50 of the stroller. Certainly, proper angling adjustment of C-shaped vise 31 can be performed through rotating the L-shaped bracket 30 around the respective threaded bar 20 of the end cap 2. While in fastening, the adjusting bolt 33 can be applied to fasten the C-shaped vise 31 onto the respective side bar 50 of the stroller 5. Under such an arrangement, the rain canopy apparatus can be installed to the stroller 5 successfully. In the aforesaid description, to meet various strollers 5 with different distances between side bars 50, proper adjustment upon the engaging position between the inward flange 21 of each end cap 2 and the respective slippery groove 13 on the upper half pipe 10 can amend the difference in application length so that both clamps 3 can be fastened to the respective side bars 50 of the stroller 5. While the rain canopy apparatus according to the present invention is installed to the stroller 5, a tie-up belt 14 attached proximately to a center of the upper half pipe 10 can be used to avoid the rain canopy apparatus loosen from the stroller 5 during a riding on a ragged road. The tie-up belt 14 itself is a detachable strip, having one end for penetrating the shell of the upper half pipe 10 to be fixed on the shell or for being hooked to a ring located at the upper half pipe 10. Thereby, another end of the tie-up belt 14 can be wound around a top horizontal bar 51 of the stroller 5 and then attached to a specific location on the belt 14 for forming an additional anti-slipping fixation of the rain canopy apparatus onto the stroller 5, other than aforesaid fixation formed by clamping between the clamp 3 and the side bars 50 of the stroller 5.

Figure 5:
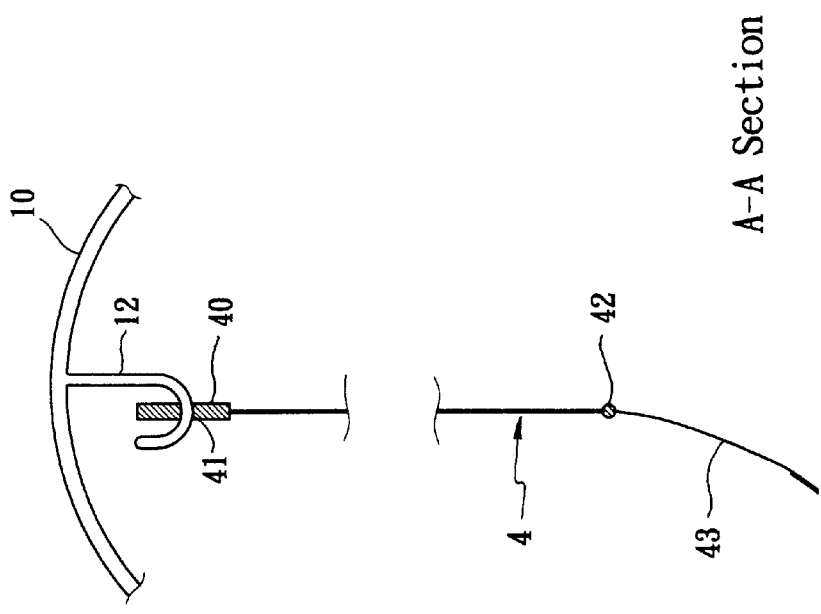
FIG. 5 is a schematic side view of the canopy of FIG. 4 hanged to a hook inside the accommodation pipe.
Figure 4:
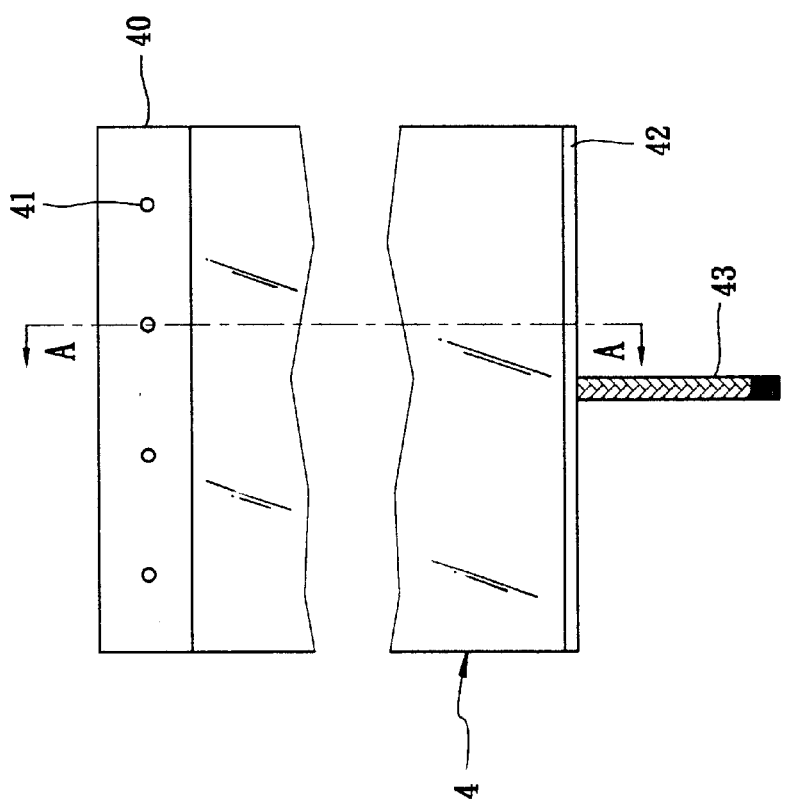
FIG. 4 is a plan view of a folding canopy in accordance with the present invention.
Figure 7:
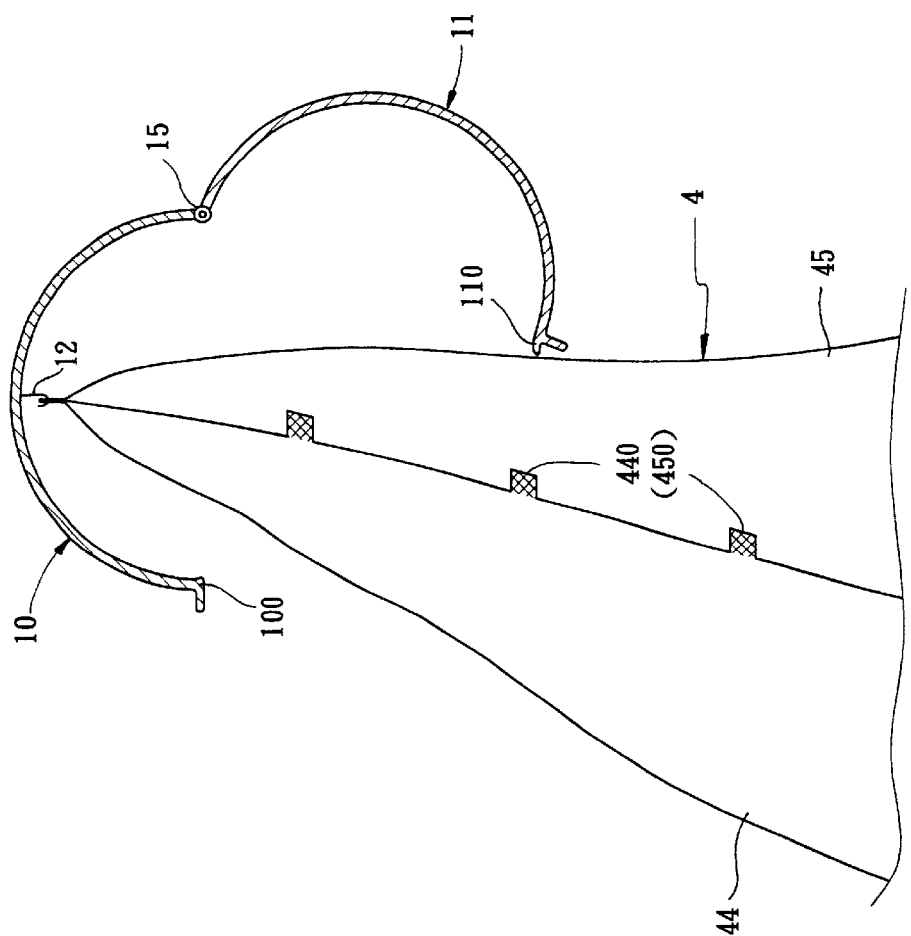
FIG. 7 shows laterally an extended state of the canopy as well as the opened accommodation pipe.
Figure 6:
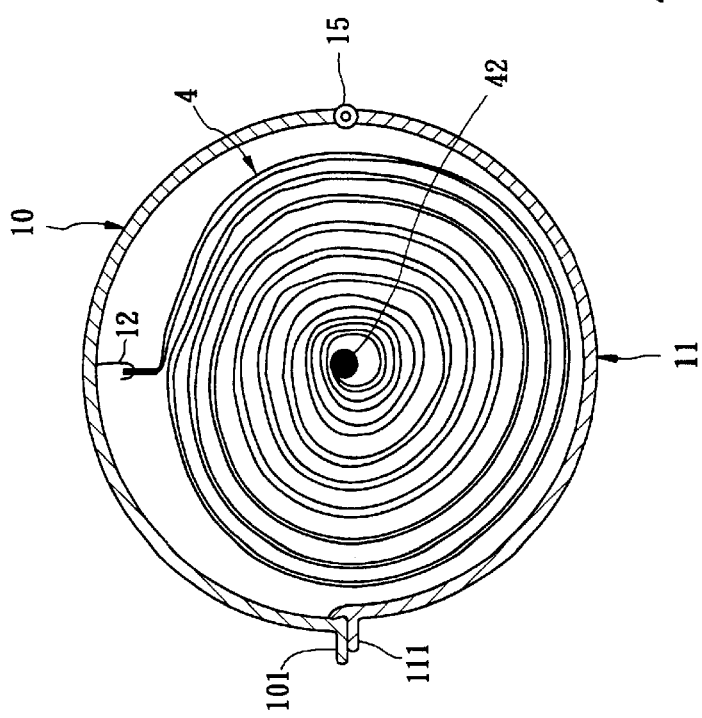
FIG. 6 is a cross section view of the accommodation pipe having the canopy stored inside.

Referring now to FIG. 2 and FIG. 4 through FIG. 7, the accommodation pipe 1 formed by the upper half pipe 10 and the lower half pipe 11 has an interior accommodation space for receiving the canopy 4. The canopy 4, formed as a thin transparent waterproof cover, has a thicker edge 40 formed at one end with a plurality of equal-spaced holes 41. Another end of the canopy 4 is connected with a slender spool 42 having an anchoring belt 43 located close to a center thereof. The anchoring belt 43 itself is also detachable as the aforesaid tie-up belt 14. The canopy 4 utilizes the holes 41 on the thicker edge 40 to hang on the interior hook 12 of the accommodation pipe 1 (as shown in FIG. 5). The canopy 4 is rolled up by the lower spool 42 and then stored into the accommodation pipe 1. Then, a storage space for the roll-up canopy 4 in the accommodation pipe 1 is formed by closing pivotally the upper and the lower half pipes 10 and 11 through the pivotal shaft 15 in between, as shown in FIG. 6. The combination and fastening between the upper and the lower half pipes 10 and 11 are made for forming central protrusion edges 100 and 110 to the upper and the lower half pipes 10 and 11, respectively, According to the present invention, the procedures for the canopy 4 to shield upon the stroller 5 are to open the accommodation pipe 1 by separating pivotally the upper half pipe 10 and the lower half pipe 11 around the pivotal shaft 15, and then to unfold the canopy 4 freely by its own weight for covering the stroller 5 as shown in FIG. 7. For convenient operation, on the upper half pipe 10 and the lower half pipe 11, a pair of lift plates 101, 111 can be alternatingly arranged to the central portions of the upper half pipe 10 and the lower half pipe 11, so that the upper half pipe 10 and the lower half pipe 11 can be easily handled.

Figure 8:
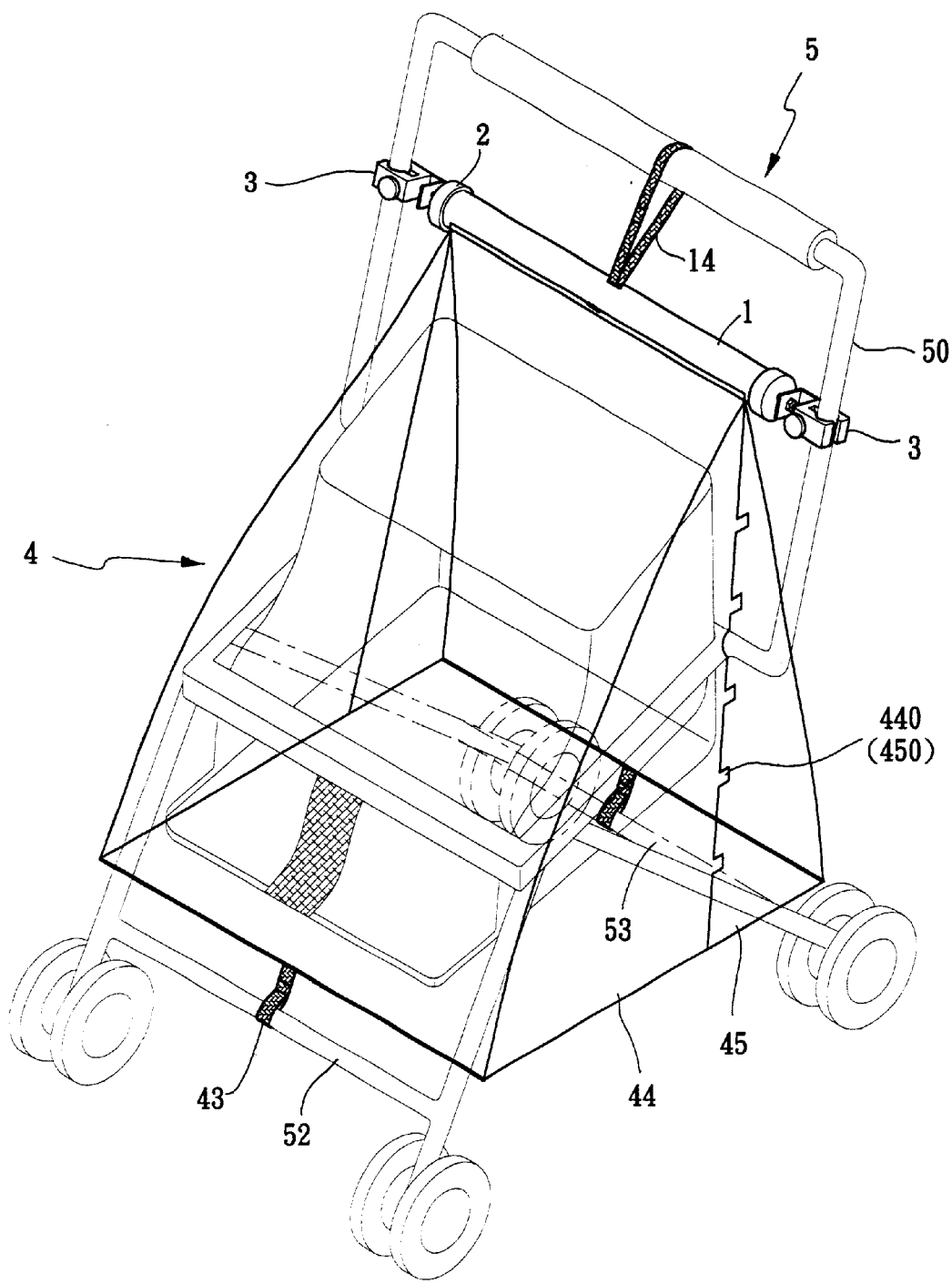
FIG. 8 shows a usage state of the rain canopy apparatus on the stroller.

Referring now to FIG. 8, according to the present invention, while the canopy 4 is unfolded and extended to cover the whole stroller 5, the side bars 50 form kinds of barrier to obstacle the covering of the canopy 4. To resolve this problem, the canopy 4 is formed by two pieces of cloth 44 and 45 extending from the thicker edge 40 of the canopy 4. Along the extending edge of the cloth 44 or 45, a plurality of equal-spaced detachable bonded tapes 440 or 450 are included thereof While extending the canopy 4, the cloth 44 and 45 are pulled across the side bars 50 of the stroller 5 and then bonded together by detaching the bonded tapes 440 and 450, so that a complete canopy 4 is formed as a whole to prevent rain drops from the lateral sides of the canopy 4. In addition, the lower tie-up belts 14 of the canopy 4 can be included and used to tie on the front and the rear lower horizontal bars 52 and 53 while using the canopy 4, so that the wind effect upon the stroller 5 can be reduced to a minimum. In the case that damage of the canopy 4 during usage, a new canopy 4 can be easily replaced inside the accommodation pipe 1 through the hook 12, without any replacement of other parts. So, economic and environment reservation benefit can be achieved.

Figure 9:
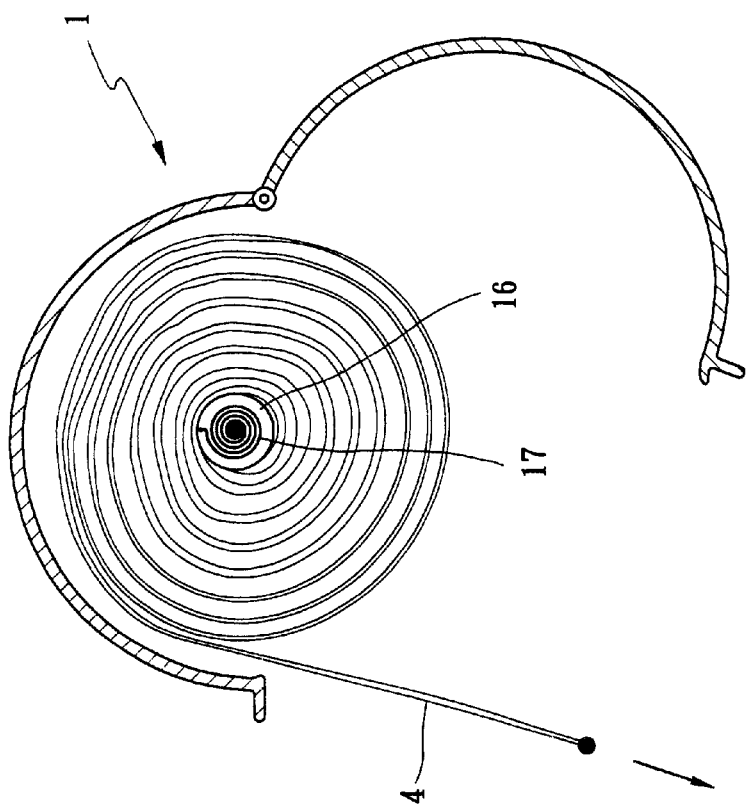
FIG. 9 shows a state of the accommodation pipe having a folding canopy.

Referring now to FIG. 9, an automatic rolling device can also be applied to the canopy 4. As shown, a roll-up shaft 16 can be mounted to connect both ends of the accommodation pipe 1, and a worm spring 17 is fixed to each end of the roll-up shaft 16. The upper edge of the canopy 4 is then fixed by any means to the roll-up shaft 16. The canopy 4 is rolled up around the shaft 16. By releasing the potential spring energy stored in the worm gear 17 while pulling out the canopy 4, the canopy 4 can then be automatically rolled up around the shaft 16 and stored into the accommodation pipe 1.

According to aforesaid description, the present invention has the following advantages.

1. The rain canopy apparatus can be a general equipment to a stroller with great usage convenience.

2. The roll-up and storable canopy provides not only a good appearance, but the great operability as well.

3. The canopy is replaceable, so that the maintenance cost can be reduced and the environment can be well reserved.

4. The canopy can be equipped with lower belts for being fixed to the lower horizontal bars, so that the stability and the wind-resistance of the stroller assembly can be increased.

5. Bonded tapes are used to integrate the two-piece canopy, so that the side bars of the stroller can not form an obstacle of applying the canopy. Also, rains can be prevented from invasion by bonding the canopy. Further, the two-piece canopy provides a better air flow inside the canopy, so that more comfort can be provided to the infant in the stroller.

While the present invention has been particularly shown and described with reference to preferred embodiments, it will be understood by those skilled in the art that various changes in form and detail may be without departing from the spirit and scope of the present invention.

I claim:

1. A rain canopy apparatus for a stroller, comprising:

an accommodation pipe, formed by pivotally connecting an upper half pipe and a lower half pipe, the upper half pipe being longer than the lower half pipe, the upper half pipe having two pairs of grooves located at each end thereof, the upper half pipe further including a plurality of interior hooks, and the upper and the lower half pipes having protrusion edges;

two end caps, each end cap having an open end and a closed end, the closed end having a central protruding threaded bar, the open end having a pair of inward flanges to mate with the respective grooves of the upper half pipe for the end cap being, longitudinally slidable along the accommodation pipe;

two clamps, each clamp having a C-shaped vise and an adjusting nut located on top of the C-shaped vise for controlling the tightness of the clamp, each C-shaped vise extending at a respective end to form an L-shaped bracket having a threaded hole for receiving the threaded bar of each respective end cap, the C-shaped vise being fastenable to a respective side bar of a stroller to anchor the accommodation pipe below a top horizontal bar of a stroller; and a canopy having a transparent thin waterproof cover with a closed end with a thicker edge locating a plurality of equal-spaced holes for connecting with the respective hooks of the upper half pipe, another end thereof forming a spool to roll up the canopy for storage inside the accommodation pipe, the spool having a central downward detachable tie-up belt connectable with a front lower horizontal bar of a stroller while extending the canopy, the canopy further splitting into two pieces from the thicker edge, and each piece having a plurality of lateral bonded tapes for adhering to another piece and thereby forming the whole canopy.

2. The rain canopy apparatus for a stroller according to claim 1, wherein said upper half pipe of said accommodation pipe further includes a central detachable exterior tie-up belt connectable with a top horizontal bar to prevent possible slipping of said accommodation pipe.

3. The rain canopy apparatus for a stroller according to claim 1, wherein said canopy is pulled out of said accommodation pipe with the thicker edge hung at said hooks under an open state of said accommodation pipe having said upper half pipe pivoted away of said lower half pipe.

4. The rain canopy apparatus for a stroller according to claim 3, wherein said canopy has a pair of said lower tie-up belts.

5. The rain canopy apparatus for a stroller according to claim 1, wherein said upper half pipe and said lower half pipe have a pair of alternatingly arranged lift plates.

6. The rain canopy apparatus for a stroller according to claim 1, wherein said accommodation pipe further includes a roll-up shaft located along a center line of said accommodation pipe, the roll-up shaft having a pair of worm springs on both ends thereof, with said thicker edge fixed to the roll-up shaft, rolling of said canopy being controllable by the worm springs.

* * * * *